(12) United States Patent
Saw

(10) Patent No.: US 7,352,736 B2
(45) Date of Patent: Apr. 1, 2008

(54) CHANNEL SYNCHRONIZATION APPARATUS OF TDD-BASED MOBILE COMMUNICATION TERMINAL

(75) Inventor: Yoo-Sok Saw, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 635 days.

(21) Appl. No.: 10/831,608

(22) Filed: Apr. 23, 2004

(65) Prior Publication Data
US 2004/0213200 A1    Oct. 28, 2004

(30) Foreign Application Priority Data
Apr. 23, 2003    (KR)    ................ 10-2003-0025800

(51) Int. Cl.
*H04J 3/06* (2006.01)
(52) U.S. Cl. ............... 370/350; 370/249; 370/278; 370/280
(58) Field of Classification Search ........... 370/249, 370/278, 280, 350
See application file for complete search history.

(56) References Cited

U.S. PATENT DOCUMENTS

| | | | |
|---|---|---|---|
| 5,742,589 A * | 4/1998 | Murata | 370/249 |
| 6,006,112 A * | 12/1999 | Rucki et al. | 455/561 |
| 6,496,572 B1 * | 12/2002 | Liang et al. | 379/93.35 |

FOREIGN PATENT DOCUMENTS

| | | |
|---|---|---|
| EP | 1 083 684 A2 | 3/2001 |
| JP | 61-146023 | 12/1984 |
| JP | 01-215134 | 8/1989 |
| JP | 07-212339 | 8/1995 |
| JP | 08-186555 | 7/1996 |
| JP | 8186555 | 7/1996 |
| JP | 11-127104 | 5/1999 |
| JP | 11127104 | 5/1999 |
| WO | WO 02/11317 A1 | 2/2002 |

* cited by examiner

*Primary Examiner*—Rafael Perez-Gutierrez
*Assistant Examiner*—Abdias Mondesir
(74) *Attorney, Agent, or Firm*—Lee, Hong, Degerman, Kang & Schmadeka

(57) ABSTRACT

An apparatus and method for synchronizing the transmission of uplink signals and reception of downlink signals by a terminal in a mobile communication system is disclosed, the apparatus and method allowing the terminal itself to adaptively compensate for deflection generated in synchronization of the transmission channel and to recover a synchronization error of the transmission channel without re-setting communications with the base station. A feedback path is formed between a transmitting unit, a receiving unit and a processing unit to facilitate frequently checking the synchronization between uplink and downlink timeslots by generating a reference signal input to the transmitting unit and comparing a signal received from the receiving unit. The channel synchronization apparatus and method may be adapted for a terminal using a software-based modem or a hardware-based modem.

45 Claims, 3 Drawing Sheets

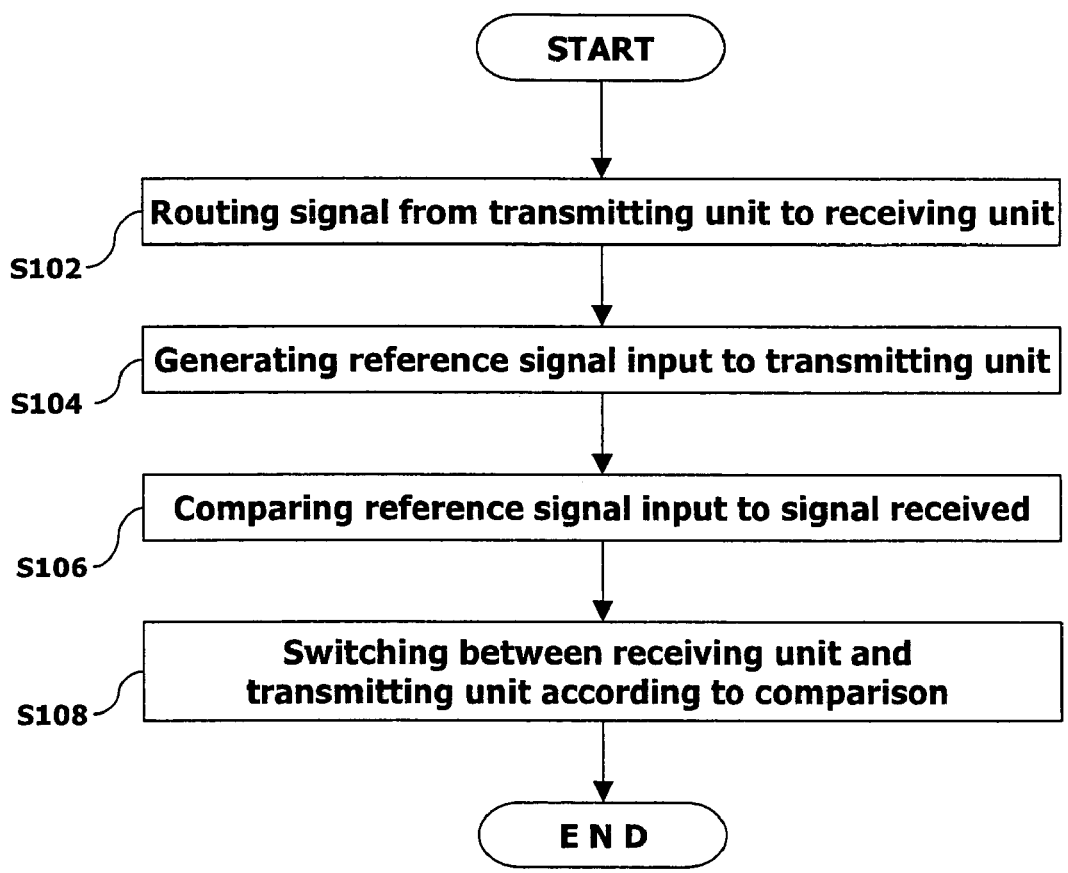

CHANNEL SYNCHRONIZATION APPARATUS OF TDD-BASED MOBILE COMMUNICATION TERMINAL

CROSS-REFERENCE TO RELATED APPLICATIONS

Pursuant to 35 U.S.C. § 119(a), this application claims the benefit of earlier filing date and right of priority to Korean Application No. 25800/2003, filed on Apr. 23, 2003, the contents of which is hereby incorporated by reference herein in their entirety:

BACKGROUND OF THE INVENTION

1. Field of the Invention

The present invention relates to a TDD (Time Division Duplex)-based mobile communication system and, more particularly, to an apparatus and method for synchronizing the transmission of uplink signals and reception of downlink signals by a terminal in a mobile communication system.

2. Description of the Related Art

TDD is a duplexing technique which temporally divides a radio channel so that one portion of a frame period is allocated for uplink transmission and the remaining portion of the frame period is allocated for downlink transmission. TDD is a third-generation mobile communication system defined by UTRA (UMTS Terrestrial Radio Access) standards of an ETSI (European Telecommunications Standards Institute) UMTS (Universal Mobile Telecommunications Systems).

In a TDD communication system, transmission and reception of wireless signals are made in a common frequency band. Since the same frequency is used for uplink transmissions and downlink transmissions in a TDD system, the transmissions to and from a terminal are carried according to time slots previously set by a base station.

In a frequency division duplex (FDD) communication system, because radio bands for transmission and reception are separated, uplink/downlink synchronization does not need to be adjusted. As long as these bands are within a defined range, transmission and reception channels can be easily obtained.

In comparison, accurate uplink/downlink synchronization is a requisite for a TDD system. Unless synchronization is maintained, communications are not possible. Additionally, multimedia communications such as a voice or image, for which an initial synchronization must be acquired, requires even more precise uplink/downlink synchronization.

Referring to FIG. 1, a schematic block diagram of a related art TDD terminal is illustrated. As shown in FIG. 1, the related art TDD terminal 1 includes a transmitter 60, a receiver 70, a TDD switch 40, and a digital base-band modem 10 (hereinafter referred to as a 'modem').

The transmitter 60 further includes a filter 20, a digital/analog converter 21, an intermediate frequency (IF) signal processor 22, and an RF signal processor 23. The receiver 70 further includes an RF signal processor 33, an IF signal processor 32, an A/D converter 31 and a filter 30. The transmitter 60 converts a data signal into a radio frequency (RF) signal. The receiver 70 converts a received RF signal to a signal that the modem can process. The TDD switch 40 performs a switching operation to alternately connect an antenna 85 to the receiver 70 or to the transmitter 60. The modem 10 further includes a software controller 11 and controls the TDD switch 40.

The TDD switch 40 performs a switching operation to connect the antenna 85 to the RF signal processor 33 of the receiver 70 for receiving downlink signals (downlink switching) or to the RF signal processor 23 of the transmitter 60 for transmitting uplink signals (uplink switching). The switching is done in such a manner that a downlink time slot and an uplink time slot do not overlap.

The uplink/downlink synchronization process of the terminal 1 is performed when the antenna 85 receives an RF downlink signal. When the TDD switch 40 connects the antenna 85 to the receiver 70 (downlink-switching), an RF signal collected by the antenna is transferred to the RF signal processor 23 and then to the IF signal processor 32. The RF signal is converted by the IF signal processor 32 into an IF signal which passes through the A/D converter 31 and filter 30 to the modem 10.

The modem 10 demodulates the received signal and detects a boundary of the downlink time slot, which is a switching point for downlink transmission. The modem 10 then determines a switching time of the TDD switch 40, taking into consideration a signal processing delay time defined by the communication system.

The signal processing delay time is the time required for elements constituting the transmitter 60 and receiver 70 to process signals indiscriminately transferred to a terminal from a base station in the system. Since the signal processing delay time is a fixed value, it may be much different from the actual delay times of elements provided in any particular terminal 1.

When the switching point is determined, the modem 10 transmits a transmission signal to the transmitter 60 for uplink transmission. According to the determined switching point, the modem 10 controls the switching operation of the TDD switch 40. Once determined, the operation of the TDD switch 40 is maintained according to the determined switching point. However, it is not known whether the TDD switch 40 operates properly.

Attempts to lower a production cost of terminals 1 have involved implementing the modem 10 in software. With a software modem 10, however, it is difficult to precisely control positions of time slots according to the software clock. Furthermore, once synchronization is obtained, the positions of the time slots may change and degraded performance may result. Because a transmission-determined point, at which uplink transmission is made, and the point at which data is actually transmitted change according to the software clock, a software-based modem 10 cannot precisely control the time slots.

If the modem 10 is based on a hardware platform, variation in the time required for a signal from the modem 10 to reach the RF signal processor 23 of the transmitter 60 is small, so the switching operation may be performed accurately. However the production costs are higher than for a software-based modem 10.

Regardless of whether the modem 10 is hardware-based or software-based, there are other drawbacks to the modem 10 of the related art. First, although the modem 10 can precisely adjust the time slot boundary of the receiver 70 by using a synchronous signal provided from the terminal 1 or from a base station (not shown), it still cannot be determined whether the transmitter 60 is accurately synchronized. Second, although synchronization of a transmission channel may be gradually adjusted, a base station generally processes communications of several terminals 1. Therefore, inaccurate transmission of one terminal 1 may affect communications of other terminals, for example if time slots of one terminal that are transmitted without being synchronized for transmission intrude upon time slots allocated to other terminals.

Due to the internal calculation process of the modem 10, data transmission is not instantaneously performed and, in most cases, the determined transmission point does not correspond to the time point at which data is actually transmitted. Therefore, it is virtually impossible for the TDD switch 40 to precisely operate so that the uplink time slot may not intrude upon the boundary of the downlink time slot.

Therefore, there is a need for an apparatus and method that performs switching between the reception of downlink signals and transmission of uplink signals in a terminal of a mobile communication system such that the uplink time slot does not intrude upon the boundary of the downlink time slot. The present invention addresses this and other needs.

SUMMARY OF THE INVENTION

An object of the present invention is to provide an apparatus and method for synchronizing the -uplink transmission and downlink reception of signals by a terminal in a TDD mobile communication system. To achieve these and other objects and in accordance with the purpose of the present invention, as embodied and broadly described herein, there is provided an apparatus and method for synchronizing uplink transmission and downlink reception by forming a feedback loop and frequently performing re-synchronization of the uplink time slot and the downlink time slot.

In one aspect of the invention, an apparatus is provided for synchronizing the transmission of uplink signals and reception of downlink signals by a terminal in a mobile communication system. The apparatus includes a receiving unit, a transmitting unit, a first switching unit, a second switching unit, and a processing unit.

The receiving unit receives an RF downlink signal and converts the received signal to a digital data signal that can be processed by the processing unit. The transmitting unit converts a digital data signal into an RF signal and transmits the RF signal to an antenna for uplink communication. The first switching unit switches between the receiving unit (downlink processing) and transmitting unit (uplink processing) under control of the processing unit. The second switching unit (hereinafter referred to as 'synchronization switch') facilitates routing a signal from the transmitting unit to the receiving unit when it is desired to compare a reference signal input to the transmitting unit to a reference signal received from the transmitting unit in order to determine the synchronization of the uplink and downlink timeslots.

With a signal from a transmitting unit routed to a receiving unit by the synchronization switch, the relationship between a signal input to the transmitting unit and a signal output may be determined in order to compensate for any intrusion of the uplink time slot-upon the boundary of the downlink time slot. The processing unit generates a digital data signal input to the transmitting unit, compares the generated digital data signal to a digital data signal received from the receiving unit and controls the first switching unit according to the relationship between the generated digital data signal and digital data signal received from the receiving unit in order to re-synchronize the uplink and downlink timeslots.

In a preferred embodiment, the synchronization switch opens and closes a signal transmission path (hereinafter referred to a 'feedback path') between the transmitting unit and receiving unit, also under control of the processing unit. Furthermore, the processing unit, preferably a modem, may synchronously control the first switching unit and synchronization switch such that the feedback path is open when an RF signal is being transmitted to the antenna for uplink processing or when an RF signal is being received from the antenna for downlink processing. It is contemplated that the modem may be software-based or hardware-based.

It is contemplated that the feedback path may connect intermediate portions of the transmitting unit and receiving unit when the feedback path is closed, for example the output of a D/A of the transmitting unit to the input of an A/D of the receiving unit such that an analog signal from the transmitting unit is routed to the receiving unit It is further contemplated that the feedback path may connect end portions of the transmitting unit and receiving unit when the feedback path is closed, for example the output of an RF signal processor of the transmitting unit to the input of an RF signal processor of the receiving unit such that an RF signal from the transmitting unit is routed to the receiving unit.

A signal generating unit, a signal analyzing unit and a controller may also be provided. Preferably, the signal generating unit, signal analyzing unit and controller are part of the processing unit.

The signal generating unit provides a synchronous reference signal input with a certain pattern to the transmitting unit. A pattern selector may also be provided to select the certain pattern of the synchronous signal input, for example a periodic or non-periodic signal.

The signal analyzing unit compares the reference signal input to a signal received from the receiving unit via the synchronization switch. For example, the signal analyzing unit may determine the deflection between the certain pattern of the reference signal input and a pattern of the signal received with the determined deflection used to control the first switching unit. In a preferred embodiment, the deflection is determined in consideration of a transmission point of the transmitting unit and the processing delay times of the transmitting unit and receiving unit.

The controller controls the first switching unit according to the comparison performed by the signal analyzing unit in order to re-synchronize the uplink and downlink timeslots. In a preferred embodiment, the controller is a software controller.

In another aspect of the invention, an apparatus is provided for synchronizing the transmission of uplink signals and reception of downlink signals by a terminal in a mobile communication system having a transmitting unit, a receiving unit and a TDD switch for switching between the transmitting unit and receiving unit. The apparatus includes a switching unit, a pattern analyzing unit, and a modem. It is contemplated that the modem may be software-based or hardware-based.

The switching unit provides a feedback path for routing a signal from the transmitting unit to the receiving unit when it is desired to compare a reference signal input to the transmitting unit to a reference signal received from the transmitting unit in order to determine the synchronization of the uplink and downlink timeslots. The pattern analyzing unit analyzes a pattern of a synchronous signal received at the receiving unit. The modem controls the TDD switch and the switching unit according to the analysis performed by the pattern analyzing unit.

In a preferred embodiment, the switching unit opens and closes a feedback path between the transmitting unit and receiving unit under control of the modem. Furthermore, the modem may synchronously control the switching unit and TDD switch such that the feedback path is open when an RF signal is being transmitted to the antenna for uplink processing or when an RF signal is being received from the antenna for downlink processing.

It is contemplated that the feedback path provided by the switching unit may connect intermediate portions of the transmitting unit and receiving unit, for example the output of a D/A of the transmitting unit to the input of an A/D of the receiving unit such that an analog signal from the transmitting unit is routed to the receiving unit. It is further contemplated that the feedback path may connect end portions of the transmitting unit and receiving unit, for example the output of an RF signal processor of the transmitting unit to the input of an RF signal processor of the receiving unit such that an RF signal from the transmitting unit is routed to the receiving unit.

In a preferred embodiment, the modem includes a signal generator and a controller. The signal generator provides a synchronous reference signal input with a certain pattern to the transmitting unit. The controller controls the TDD switch according to the analysis performed by the pattern analyzing unit. The modem may also include a pattern selector to select the certain pattern of the synchronous signal input, for example a periodic or non-periodic signal.

The analysis performed by the pattern analyzing unit may determine the deflection between the certain pattern of the synchronous reference signal input and a pattern of the signal received with the determined deflection used to control the TDD switch. In a preferred embodiment, the deflection is determined in consideration of a transmission point of the transmitting unit and the processing delay times of the transmitting unit and receiving unit.

In another aspect of the invention, a method is provided for synchronizing the transmission of uplink signals and reception of downlink signals by a terminal in a mobile communication system. The method includes routing a signal from a transmitting unit to a receiving unit, generating a digital data reference signal input to the transmitting unit, comparing the digital data reference signal to a digital data signal received from the receiving unit, and switching between the receiving unit and transmitting unit according to the comparison.

Routing a signal from a transmitting unit to a receiving unit facilitates determining the relationship between a signal input to the transmitting unit and a signal output from the transmitting unit. Generating a digital data reference signal input to the transmitting unit and comparing the generated digital data reference signal to a digital data signal received from the receiving unit facilitates detecting any intrusion of the uplink time slot upon the boundary of the downlink time slot. Switching between the receiving unit and transmitting unit according to the comparison facilitates re-synchronizing the uplink and downlink time slots.

In a preferred embodiment, routing a signal from a transmitting unit to a receiving unit is done by controlling a first switch to provide a feedback path between the transmitting unit and receiving unit and switching between the receiving unit and transmitting unit is done by controlling a second switch, both under control of a processing unit. Furthermore, synchronous control the first switch and second switch may be provided such that the feedback path is open when the transmitting unit is transmitting an RF signal or when an RF signal is received by the receiving unit. Moreover, the digital data reference signal may be generated as a synchronous signal having a certain pattern.

It is contemplated that routing a signal from a transmitting unit to a receiving unit may connect intermediate portions of the transmitting unit and receiving unit, for example the output of a D/A of the transmitting unit to the input of an A/D of the receiving unit such that an analog signal from the transmitting unit is routed to the receiving unit. It is further contemplated that routing a signal from a transmitting unit to a receiving unit may connect end portions of the transmitting unit and receiving unit, for example the output of an RF signal processor of the transmitting unit to the input of an RF signal processor of the receiving unit such that an RF signal from the transmitting unit is routed to the receiving unit.

Comparing the generated digital data reference signal to a digital data signal received from the receiving unit may determine a deflection between the pattern of the reference signal input and a pattern of the signal received. In a preferred embodiment, the deflection is determined in consideration of a transmission point of the transmitting unit and the processing delay times of the transmitting unit and receiving unit.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 3 illustrates a method for synchronizing uplink transmission and downlink reception of signals in accordance with a one embodiment of the present invention.

DETAILED DESCRIPTION OF THE PREFERRED EMBODIMENTS

Figure 1:
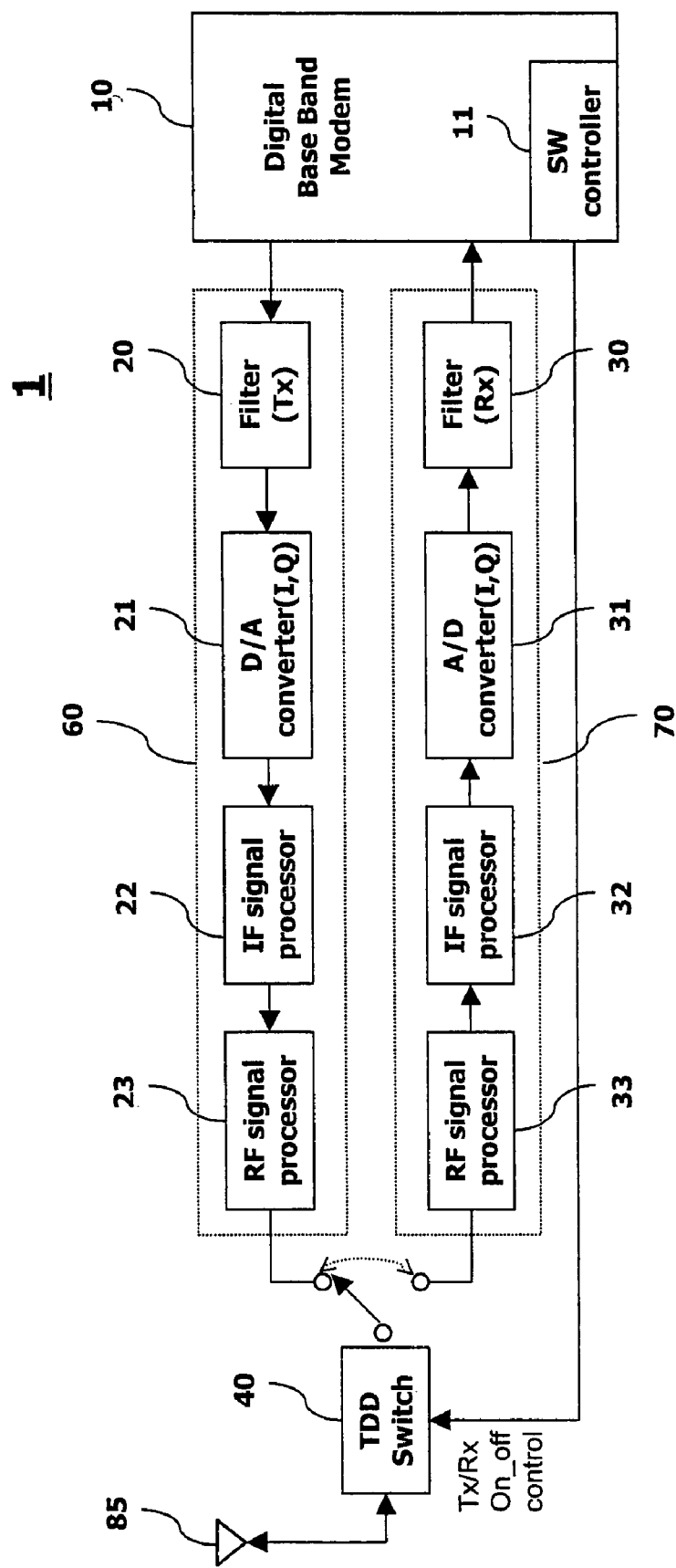
FIG. 1 is a schematic block diagram showing the structure of a related art TDD terminal.

The present invention relates to an apparatus and method for synchronizing the uplink transmission and downlink reception of signals by a terminal in a mobile communication system by forming a feedback loop to facilitate frequently performing re-synchronization of the uplink time and the downlink time slot. Although the present invention is illustrated with respect to a terminal in a TDD mobile communication system, it is contemplated that the present invention may be utilized anytime it is desired to synchronize uplink signal transmission and downlink signal reception in a mobile communication system. In order to not to distract from the subject matter of the present invention, the same reference numerals are given to the same elements or equivalent parts to those of a related art and detailed descriptions thereof are omitted.

Figure 2:
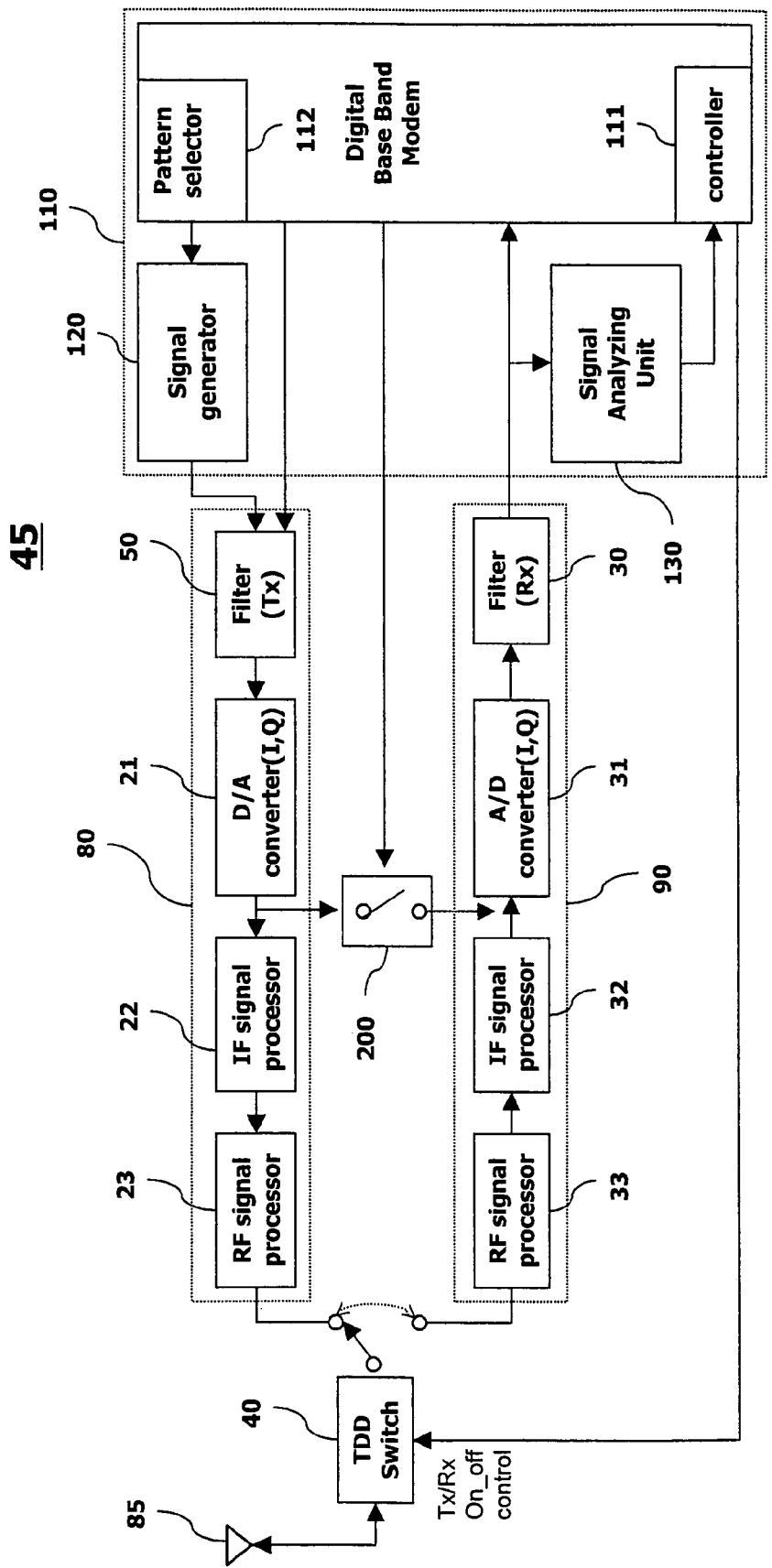
FIG. 2 illustrates a schematic block diagram of an apparatus for synchronizing uplink transmission and downlink reception of signals in accordance with one embodiment of the present invention.

FIG. 2 illustrates an apparatus 45 for synchronizing uplink transmission and downlink reception of signals in accordance with one embodiment of the present invention. The apparatus 45 includes a receiving unit 90, a transmitting unit 80, a first switching unit 40, a second switching unit 200, and a processing unit 110.

The apparatus 45 provides a feedback path between a transmission path and a reception path by forming a feedback loop connecting the transmitting unit 80, the receiving unit 90 and the processing unit 110. A synchronous pattern reference signal input to the transmitting unit 110 may be generated by the processing unit 110 and routed back to the processing unit by the feedback path from an intermediate component of the transmitting unit in order to frequently check synchronization of the uplink and downlink timeslots by comparing the reference signal input to a reference signal received from the receiving unit.

The first switching unit 40 switches between the receiving unit (downlink) and transmitting unit (uplink) under control of the processing unit 110. In a preferred embodiment, the first switching unit 40 is a TDD switch.

When the first switching unit 40 connects an antenna 85 to the receiving unit 90, the receiving unit converts an RF signal from the antenna into a digital data signal that can be processed by the processing unit 110. In a preferred embodiment, the receiving unit 90 is an RF receiver that includes the same elements and functions as a receiver of the related art; an RF signal processor 33, an IF signal processor 32, an A/D converter 31 and a filter 30.

When the first switching unit 40 connects an antenna 85 to the transmitting unit 80, a digital data signal converted into an RF signal is transmitted to the antenna for uplink communication. In a preferred embodiment, the transmitting unit 80 includes the same elements and functions as a transmitter of the related art; an RF signal processor 23, an IF signal processor 22, an A/D converter 21 and a filter 20.

The synchronization switch 200 facilitates routing a signal from the transmitting unit 80 to the receiving unit 90 when it is desired to re-synchronize the uplink and downlink timeslots. In a preferred embodiment, the synchronization switch 200 opens and closes a feedback path between the transmitting unit 80 and receiving unit 90 under control of the processing unit 110.

As illustrated in FIG. 2, the synchronization switch 200 connects intermediate portions of the transmitting unit 80 and receiving unit 90 when the feedback path is closed, specifically the output of a D/A 21 of the transmitting unit to the input of an A/D 31 of the receiving unit such that an analog signal from the transmitting unit is routed to the receiving unit. In another embodiment of the invention, the synchronization switch 200 may connect end portions of the transmitting unit 80 and receiving unit 90 when the feedback path is closed, for example the output of an RF signal processor 23 of the transmitting unit to the input of an RF signal processor 33 of the receiving unit such that an RF signal from the transmitting unit is routed to the receiving unit.

The processing unit 110 generates a digital data signal input to the transmitting unit 80, compares the generated digital data signal to a digital data signal received from the receiving unit 90 and controls the first switching unit 40 according to the comparison in order to re-synchronize the uplink and downlink timeslots. In a preferred embodiment, the processing unit 110 is a modem that synchronously controls the first switch 40 and synchronization switch 200, for example by using the same signal, such that the feedback path is open when an RF signal is being transmitted to the antenna 85 for uplink processing or when an RF signal is being received from the antenna 85 for downlink processing. It is contemplated that the modem 110 may be software-based or hardware-based.

A signal generating unit 120, a signal analyzing unit 130 and a controller 111 may also be provided. Preferably, the signal generating unit 130, signal analyzing unit 130 and controller 111 are part of the processing unit 110.

The signal generating unit 120, for example a synchronous signal generator, provides a synchronous reference signal input with a certain pattern to the transmitting unit 80. A pattern selector 112, preferably also part of the processing unit 110, may be provided to select the certain pattern of the synchronous signal input, for example a periodic or non-periodic signal.

The signal analyzing unit 130 compares the reference signal input to a signal received from the receiving unit 90 via the synchronization switch 200. For example, the signal analyzing unit 130 may determine the deflection between the certain pattern of the reference signal input and a pattern of the signal received with the determined deflection used to control the first switching unit. In a preferred embodiment, the deflection is determined in consideration of a transmission point of the transmitting unit 80 and the processing delay times of the components that are included in the transmitting unit and receiving unit 90.

For example, in the apparatus 45 illustrated in FIG. 2, the deflection is determined in consideration of the delay times of the filter 20 and D/A converter 21 of the transmitting unit 80 and the delay times of the filter 30 and D/A converter 31 of the receiving unit 90. If the second switch 200 is located such that an RF signal from the RF signal processor 23 of the transmitting unit 80 is routed to the RF signal processor 33 of the receiving unit 90, the deflection is also determined in consideration of the delay times of the RF signal processor and IF signal processor 22 of the transmitting unit 80 and the of the delay times of the RF signal processor and IF signal processor 32 of the receiving unit 90.

The controller 111 receives information from the signal analyzing unit 120 regarding the relationship between the reference signal input to the transmitting unit 80 and the signal received from the receiving unit 90. The controller 111 controls the first switching unit according to the comparison performed by the signal analyzing unit 120 in order to re-synchronize the uplink and downlink timeslots. In a preferred embodiment, the controller 111 is a software controller.

FIG. 3 illustrates a method 100 for synchronizing the transmission of uplink signals and reception of downlink signals by a terminal in a mobile communication system. The method includes routing a signal from a transmitting unit to a receiving unit S102, generating a digital data reference signal input to the transmitting unit S104, comparing the digital data reference signal to a digital data signal received from the receiving unit S106, and switching between the receiving unit and transmitting unit according to the comparison S108. The method is preferably performed in a modem, which may be software-based or hardware-based.

Routing a signal from a transmitting unit to a receiving unit (S102) facilitates determining the relationship between a signal input to the transmitting unit and a signal output from the transmitting unit. Generating a digital data reference signal input to the transmitting unit (S104) and comparing the generated digital data reference signal to a digital data signal received from the receiving unit (S106) facilitates detecting any intrusion of the uplink time slot upon the boundary of the downlink time slot. Switching between the receiving unit and transmitting unit according to the comparison (S108) facilitates re-synchronizing the uplink and downlink time slots.

Prior to performing the method 100, the terminal synchronizes uplink and downlink timeslots on the basis of collected information using a method known in the art. The terminal sets a base station and a reception channel, collects information on entire time slots allocated to itself and on reception time slots, and performs receiving synchronization on the basis of the collected information. After the receiving synchronization is completed, the terminal detects a boundary point of transmission and reception time slots on the basis of the collected information (information on the entire time slots and reception time slots). The terminal then performs transmission synchronization. In order to confirm whether transmission synchronization is correct, the terminal may perform the method 100.

In step S102, a synchronization switch 200 is utilized to route a signal from a transmitting unit 80 to a receiving unit 90. Preferably a processing unit 110,controls the synchronization switch 200 to provide a feedback path.

The feedback path may connect intermediate portions of the transmitting unit 80 and receiving unit 90, for example the output of a D/A 21 of the transmitting unit to the input of an A/D 31 of the receiving unit such that an analog signal from the transmitting unit is routed to the receiving unit. On the other hand, the feedback path may connect end portions of the transmitting unit 80 and receiving unit 90, for example the output of an RF signal processor 23 of the transmitting unit to the input of an RF signal processor 33 of the receiving unit such that an RF signal from the transmitting unit is routed to the receiving unit.

In step S104, a digital data reference signal is generated as an input to the transmitting unit 80. In a preferred embodiment, the digital data reference signal is a synchronous signal having a certain pattern. A signal generating unit 120, such as a signal generator, may be utilized in cooperation with a pattern selector 112 to generate the synchronous signal having a certain pattern.

In step S106, the digital data reference signal input generated in step S104 is compared to a digital data signal received at the receiving unit 90. In a preferred embodiment, a deflection between a pattern of the reference signal input and a pattern of the signal received is determined. The determination of the deflection may be performed in consideration of a transmission point of the transmitting unit 80 and the processing delay times of the transmitting unit and receiving unit 90. A signal analyzing unit 130 may be utilized to perform the comparison.

In step S108, switching between the transmitting unit 80 and receiving unit 90 is performed, preferably by controlling a second switch 40 with the processing unit 110. The switching is performed according to the comparison preformed in step S106. In a preferred embodiment, synchronous control of the synchronization switch 200 and second switch 40 is provided by a controller 111 such that the feedback path is open and the transmitting unit 80 and receiving unit 90 may be maintained separately when an RF signal is transmitted by the transmitting unit or when an RF signal is received by the receiving unit.

The apparatus and method of the present invention differs from the related art and provides several advantages. Even after the synchronization process of the transmission channel is completed, the terminal may monitor a synchronous signal transmitted through a feedback path whenever it is desired to determine if synchronization of a transmission channel is normal or not. If synchronization of the transmission channel is not normal, the terminal may restore synchronization of the transmission channel by controlling the switching between uplink and downlink processing By forming a feedback path connecting a transmitting unit 80, a receiving unit 90 and a processing unit 110, a transmission (or uplink) synchronous signal may be frequently checked and a synchronization error of the transmission channel recovered. Furthermore, the terminal itself adaptively compensates for deflection generated in synchronization of the transmission channel and recovers a synchronization error of the transmission channel without re-setting communications with the base station. Moreover, the channel synchronization apparatus and method may be adapted for a terminal using a software-based modem or a hardware-based modem.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus for synchronizing uplink and downlink transmissions in a terminal of a mobile communication system, the apparatus comprising:
   a receiving unit receiving an RF signal from an antenna and converting the received signal to a digital data signal representing the received RF signal;
   a transmitting unit converting a digital data signal intended for transmission into an RF signal and transmitting the RF signal to the antenna;
   a first switching unit switching between the receiving unit and the transmitting unit;
   a second switching unit routing a signal from the transmitting unit to the receiving unit; and
   a processing unit generating the digital data signal intended for transmission, comparing the generated digital data signal to a digital data signal generated by the receiving unit from the signal routed via the second switching unit, and controlling the first switching unit to switch between the receiving unit and the transmitting unit according to the comparison.

2. The apparatus of claim 1, wherein the second switching unit opens and closes a feedback path under control of the processing unit.

3. The apparatus of claim 2, wherein the first switching unit and second switching unit are under synchronized control of the processing unit such that the feedback path is open when an RF signal is being transmitted to or received from the antenna.

4. The apparatus of claim 2, wherein the feedback path connects an output of a D/A converter of the transmitting unit to an input of an A/D converter of the receiving unit.

5. The apparatus of claim 2, wherein the feedback path connects an output of an RF signal processor of the transmitting unit to an input of an RF signal processor of the receiving unit.

6. The apparatus of claim 1, further comprising:
a signal generating unit generating a synchronous reference signal input to the transmitting unit, the reference signal having a certain pattern;
a signal analyzing unit comparing the reference signal to a signal generated by the receiving unit from the signal routed via the second switching unit; and
a controller controlling the first switching unit according to the comparison performed by the signal analyzing unit.

7. The apparatus of claim 6, wherein the signal generating unit, signal analyzing unit and controller are part of the processing unit.

8. The apparatus of claim 6, wherein the controller is a software controller.

9. The apparatus of claim 6, further comprising a pattern selector for selecting the certain pattern of the reference signal generated by the signal generating unit.

10. The apparatus of claim 9, wherein the reference signal is one of a periodic signal and a non-periodic signal according to the pattern selector.

11. The apparatus of claim 9, wherein the pattern selector is part of the processing unit.

12. The apparatus of claim 6, wherein the signal analyzing unit determines a deflection between the pattern of the reference signal and a pattern of the signal generated by the receiving unit from the signal routed via the second switching unit and the first switching unit is controlled according to the deflection.

13. The apparatus of claim 12, wherein the deflection is determined in consideration of a transmission point of the transmitting unit and the processing delay times of the transmitting unit and receiving unit.

14. The apparatus of claim 6, wherein the processing unit controls the second switching unit to close the feedback path when the reference signal is generated.

15. The apparatus of claim 1, wherein the terminal is a time division duplex (TDD) terminal.

16. The apparatus of claim 1, wherein the processing unit is a software-based modem.

17. The apparatus of claim 1, wherein the processing unit is a hardware-based modem.

18. An apparatus for synchronizing uplink and downlink transmissions in a terminal of a mobile communication system having a transmitting unit, a receiving unit and a TDD switch for switching between the receiving unit and the transmitting unit, the apparatus comprising:
a switching unit for providing a feedback path for routing a synchronous signal from the transmitting unit to the receiving unit;
a pattern analyzing unit for analyzing a pattern of the synchronous signal received at the receiving unit; and
a modem for controlling the TDD switch and the switching unit according to the analysis performed by the pattern analyzing unit.

19. The apparatus of claim 18, wherein the switching unit opens and closes the feedback path under control of the modem.

20. The apparatus of claim 18, wherein control of the TDD switch and switching unit is synchronized such that the feedback path is open when an RF signal is being received by the receiving unit or transmitted by the transmitting unit.

21. The apparatus of claim 18, wherein the feedback path connects an output of a D/A converter of the transmitting unit to an input of an A/D converter of the receiving unit.

22. The apparatus of claim 18, wherein the feedback path connects an output of an RF signal processor of the transmitting unit to an input of an RF signal processor of the receiving unit.

23. The apparatus of claim 18, wherein the modem comprises:
a signal generator for generating a synchronous reference signal input to the transmitting unit, the reference signal having a certain pattern; and
a controller for controlling the TDD switch according to the analysis performed by the pattern analyzing unit.

24. The apparatus of claim 23, wherein the modem further comprises a pattern selector for selecting the certain pattern of the reference signal generated by the signal generator.

25. The apparatus of claim 24, wherein the reference signal is one of a periodic signal and a non-periodic signal according to the pattern selector.

26. The apparatus of claim 23, wherein the pattern analyzing unit determines a deflection between the pattern of the synchronous reference signal and a pattern of the synchronous signal routed through the receiving unit and the TDD switch is controlled according to the deflection.

27. The apparatus of claim 26, wherein the deflection is determined in consideration of a transmission point of the transmitting unit and the processing delay times of the transmitting unit and receiving unit.

28. The apparatus of claim 23, wherein the modem controls the switching unit to close the feedback path when the reference signal is generated.

29. The apparatus of claim 18, wherein the modem is a software-based modem.

30. The apparatus of claim 18, wherein the modem is a hardware-based modem.

31. A method for synchronizing uplink and downlink transmissions in a terminal of a mobile communication system, the method comprising:
routing a signal from a transmitting unit to a receiving unit;
generating a digital data reference signal input to the transmitting unit;
comparing the digital data reference signal to a digital data signal generated by the receiving unit from the signal routed from the transmitting unit; and
switching between the receiving unit to receive the downlink transmissions and transmitting unit to transmit the uplink transmissions according to the comparison.

32. The method of claim 31, wherein routing the signal comprises controlling a first switch to open and close a feedback path and switching between the receiving unit and transmitting unit comprises controlling a second switch.

33. The method of claim 32, further comprising synchronizing control of the first switch and the second such that the feedback path is open when an RF signal is being transmitted by the transmitting unit or received by the receiving unit.

34. The method of claim 32, wherein the first switch and second switch are controlled by a controller.

35. The method of claim 32, wherein closing the feedback path connects an output of a D/A converter of the transmitting unit to an input of an A/D converter of the receiving unit.

36. The apparatus of claim 32, wherein closing the feedback path connects an output of an RF signal processor of the transmitting unit to an input of an RF signal processor of the receiving unit.

37. The method of claim 31, wherein generating the digital data reference signal comprises generating a signal having a certain pattern.

38. The method of claim 31, wherein generating the digital data reference signal comprises controlling a signal generating unit.

39. The method of claim 31, wherein generating the digital data reference signal comprises controlling a pattern selector.

40. The method of claim 31, wherein comparing the digital data reference signal to the digital data signal generated by the receiving unit comprises determining a deflection between the pattern of the reference signal and a pattern of the digital data signal generated by the receiving unit.

41. The method of claim 40, wherein the deflection is determined in consideration of a transmission point of the transmitting unit and the processing delay times of the transmitting unit and receiving unit.

42. The method of claim 31, wherein comparing the digital data reference signal to the digital data signal generated by the receiving unit comprises controlling a signal analyzing unit.

43. The method of claim 31, wherein the steps of routing, generating, comparing, and switching are performed in a modem.

44. The apparatus of claim 43, wherein the modem is a software-based modem.

45. The apparatus of claim 43, wherein the modem is a hardware-based modem.

* * * * *